(12) United States Patent
Stevens

(10) Patent No.: US 6,177,168 B1
(45) Date of Patent: Jan. 23, 2001

(54) DVD DISC WITH FOUR INFORMATION LAYERS, AND METHOD FOR MAKING SAME

(75) Inventor: Paul Mark Stevens, Clarks Summit, PA (US)

(73) Assignee: Warner Music Group, Inc., Olyphant, PA (US)

( * ) Notice: Under 35 U.S.C. 154(b), the term of this patent shall be extended for 0 days.

(21) Appl. No.: 09/323,334

(22) Filed: Jun. 1, 1999

Related U.S. Application Data

(60) Provisional application No. 60/126,349, filed on Mar. 26, 1999.

(51) Int. Cl.[7] .................................................. B32B 3/02
(52) U.S. Cl. ...................... 428/64.1; 428/64.4; 428/65.2; 428/457; 428/913; 430/270.12; 430/495.1; 430/945; 369/283
(58) Field of Search .................................. 428/64.1, 64.2, 428/64.4, 65.2, 457, 913; 430/270.12, 495.1, 945; 369/275.1, 283, 288

(56) References Cited

U.S. PATENT DOCUMENTS

| | | | |
|---|---|---|---|
| 5,858,498 | * | 1/1999 | Ohkubo ............................ 428/64.1 |
| 5,871,881 | * | 2/1999 | Nishida ......................... 430/270.11 |
| 6,007,889 | * | 12/1999 | Nee ................................... 428/64.1 |
| 6,030,677 | * | 2/2000 | Ro ..................................... 428/64.1 |

* cited by examiner

Primary Examiner—Elizabeth Evans
(74) Attorney, Agent, or Firm—Gottlieb, Rackman & Reisman, P.C.

(57) ABSTRACT

A method for making a DVD-18 disc using primarily just conventional CD-type injection molding and sputtering equipments. Three substrates are molded. Each of two of the substrates has just one metallic information layer, with the opposite side being flat. The third substrate has two metallic information layers on its opposite sides. The three substrates are arranged in a sandwich configuration, with the substrate having two information layers being in the middle. Each of the outer substrates has a semireflective (gold) information layer that faces inwardly of the sandwich. The middle substrate has two fully reflective (aluminum) information layers. A very thin layer of glue is placed between the semireflective information layer on each of the outer substrates and one of the fully reflective information layers on the middle substrate.

36 Claims, 4 Drawing Sheets

(Single Layer, Single Side: DVD-5)

Expose Photoresist on Glass Master

Etch Pits into Photoresist with Developer

Metalize Surface with Nickel Sputtering

Electroform Nickel Father (Stamper)

Injection Mold Disc From Stamper

Metalize Surface with Aluminum Sputtering

Coat with Polymer Resin

Bond Substrates Together

Print Label (Dual Layer, Single Side: DVD-9)

(Dual Layer, Dual Side: DVD-18)

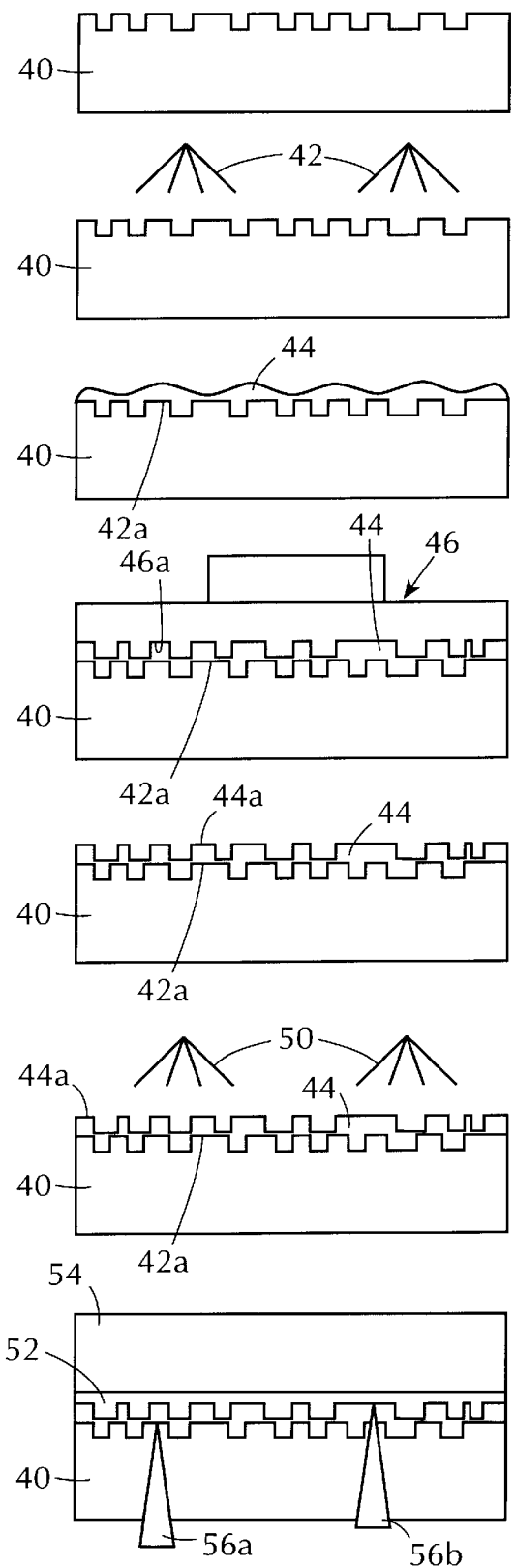

DVD DISC WITH FOUR INFORMATION LAYERS, AND METHOD FOR MAKING SAME

This application claims the benefit of United States provisional application No. 60/126,349, filed Mar. 26, 1999.

BACKGROUND OF THE INVENTION

This invention relates to optical discs, and more particularly to double-sided, 3-layer and 4-layer optical discs, such as DVD-14 and DVD-18 discs, and methods for making them.

Very high capacity optical discs have two information layers that can be read with the same laser beam. The read head focuses the beam on a selected one of the two information layers. Each information layer is a reflective coating that modulates and reflects the laser beam. The information layer closest to the side of the disc where the read head is positioned has a semireflective coating. When the laser beam is focused on this layer, sufficient light is reflected to allow the data on this layer to be read. The information layer that is remote from the side of the disc where the read head is positioned has a fully reflective coating. When the laser beam is focused on this layer, light that passes through the semireflective layer is modulated by the fully reflective layer and passes once again through the semireflective layer.

Single-layer DVD discs are made using the same type of equipment that has been used for many years in the manufacture of CDs. A substrate is injection molded to have an information layer in the form of pits and lands. The information layer is then sputtered with a fully reflective aluminum coating, and a protective coating may be applied on top of the sputtered surface. Because a DVD disc made this way has only half the thickness of a CD yet the finished DVD must be as thick as a CD, two DVD discs are bonded together to make a finished DVD. If the DVD is to have only a single information layer, then the second disc may be a blank. If the DVD is to have two information layers, two single-layer discs may be bonded together. (If reading is to take place from only one side, one of the reflective layers must be semireflective; if reading is to take place from both sides, then both reflective layers should be fully reflective.) But as long as no more than two information layers are required for a DVD, standard CD production techniques can be used to make each disc.

The problem is that standard CD production techniques are not adequate for manufacturing dual-layer optical discs that have three or more reflective coatings. The substrate and one semireflective coating can be made in the usual way—injection molding followed by sputtering (using gold to obtain a semireflective coating rather than aluminum as in the case of a CD where a fully reflective coating is needed). But the injection molding equipment used in CD production facilities can not be used to mold the additional pit-and-land structure required for a second information layer. Therefore, what has been proposed in the prior art is to coat the semireflective coating with a viscous resin and to stamp the second information layer in it (followed by conventional sputtering and application of a conformal coating). However, the companies presently in the CD production business do not generally have stamping equipment that is adequate for this purpose, and therefore new assembly lines have been proposed for producing dual-layer DVD discs.

Before proceeding, it is necessary to define certain terms as they are used herein. The word "disc" has different meanings depending on the context. It can refer to a disc-like substrate structure that makes up part of a DVD, or it can refer to the entire DVD itself. Also, the word substrate refers to an injection-molded plastic disc, while the term substrate structure refers to the same disc together with whatever coatings (sputtered, etc.) may be on it.

It is also important to understand what is meant herein by the terms stamping and stamper. Injection molding is a technique in which liquid plastic is injected into an enclosed volume (a mold). Stamping is a technique in which a press is caused to move against a solid sheet or a viscous layer of material to impress a pattern in it, the operation usually not taking place in an enclosed space. In the days of vinyl records, which records were made by stamping machines, the pattern in the press that was impressed into a flattened vinyl "biscuit" was naturally called a stamper. Since injection molds also require a pattern to impress into the injected plastic, and the pattern for a CD is made in a way reminiscent of the way vinyl record stampers were made, it was natural for the CD industry to call the pattern placed in a mold a "stamper" even though it is not used in a stamping machine. Thus as used herein the operation called stamping involves a press which moves, usually in open space, to embosses a pattern into a viscous material, and the word stamper refers to such a pattern whether it is used in stamping equipment or injection molding equipment.

It is a general object of my invention to provide a method for making 3-layer and 4-layer DVD and other optical discs using injection molding equipment that does not also require the use of stamping equipment.

It is another object of my invention to provide a method for making 3-layer and 4-layer DVD and other optical discs using primarily the equipment presently found on the assembly lines of CD and DVD manufacturers.

It is still another object of my invention to provide 3-layer and 4-layer DVD and other optical discs made by using primarily the equipment presently found on the assembly lines of CD and DVD manufacturers.

SUMMARY OF THE INVENTION

The method of the invention, for making a DVD disc using primarily just injection molding equipment, entails making three substrates. Each of two of the substrates has just one metallic information layer, with the opposite side being flat. The third substrate has two metallic information layers on its opposite sides. All three substrates are made in the usual way—with injection molding and sputtering equipment. The three substrates are arranged in a sandwich configuration, with the substrate having two information layers being in the middle. Each of the outer substrates has a semireflective (gold) information layer that faces inwardly of the sandwich. The middle substrate has two fully reflective (aluminum) information layers. A very thin layer of glue is placed between the semireflective information layer on each of the outer substrates and one of the fully reflective information layers on the middle substrate. In this way, a 4-layer disc is formed without requiring additional stamping equipment, and with all four metallic layers having been sputtered onto molded substrates. (In the event only three information layers are required, one of the outer "information" layers may be flat, i.e., it may have no pits in it. In this description, it is to be understood that, depending on the context, one of the "information" layers may actually convey no information.)

Because the middle substrate with the two fully reflective metallic layers does not pass light, it can be made of cheaper polymethyl methacrylate (PMMA) material rather than the polycarbonate of the outer substrates. Or it can be made of recycled polycarbonate. In fact, any material that can be molded with the proper stable dimensions can be used.

The nominal thickness of a DVD disc is 1.2 mm. Because the disc of my invention is a sandwich of three molded substrates and there are certain minimum thickness requirements for the substrates as will be explained below, the final sandwich thickness is 1.5 mm. This is the upper limit for the thickness of a DVD disc so the DVD specifications are still satisfied.

BRIEF DESCRIPTION OF THE DRAWINGS

It being understood that none of the drawings is to scale (as some of the dimensions are in microns, as is well understood in the art)

FIG. 3 depicts the standard steps used in the 2P process for making a prior art Dual-Layer, Single-Side DVD-9 disc;

THE PRIOR ART

The manufacture of a DVD optical disc is very similar to that of a CD optical disc. Although more care must be taken to properly replicate the tinier pits in thinner substrates, and two substrates must be bonded together, most of the production process is the same as that for a CD. In fact, as will become apparent, it is precisely because it is desired that the same type of equipment be useable in the manufacture of both products that the need for the present invention exists in the first place.

Figure 1:
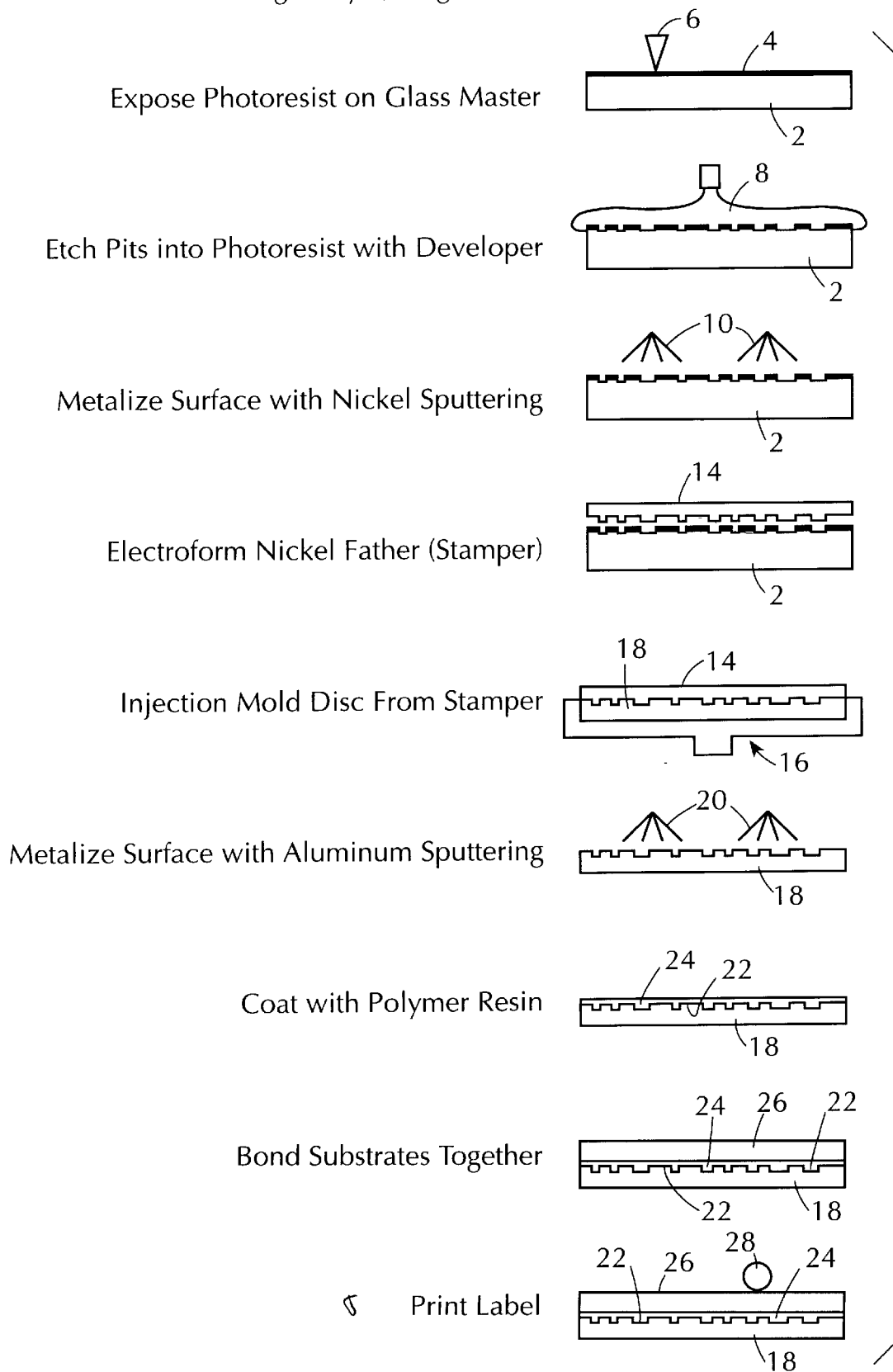
FIG. 1 depicts the standard steps in making a prior art Single-Layer, Single-Side DVD-5 disc.

The standard (prior art) DVD manufacturing process, which is basically the CD manufacturing process, is shown schematically in FIG. 1. What is depicted here are the steps in making the simplest type of DVD disc, one that is read from only a single side ("Single Side") and that has only a single information layer ("Single Layer") that can be read from that side. The disc is referred to as DVD-5 because the bit capacity is between 4 and 5 gigabytes. Manufacture begins with "mastering"—creation of metal "stampers" that will ultimately be used in replication. The first step in this process, shown in FIG. 1, is to use a laser beam 6 from a laser beam recorder machine to expose a photoresist 4 that is deposited on a glass master 2. The photoresist is then etched with developer solution 8 in order to form pits in the photoresist.

In the third step, the etched photoresist (with the required pit-and-land pattern) is metalized with nickel sputtering, shown by the numeral 10. The glass substrate with its metalized surface is then used in an electrochemical plating process ("electroforming") to create a "father" or "stamper" 14. (In many applications, the father is used to create "mother" discs, which can then be used to create multiple stampers.) The stamper, usually made of nickel, contains a mirror image of the pits that are to be created on the final discs. In the molding process, liquid plastic 18 (usually polycarbonate) is injected into a mold 16 in which the stamper is held. The raised bumps on the stamper are pressed into the liquid plastic during the injection molding process to create pits. The molded disc 18 is then metalized with aluminum sputtering, shown by the numeral 20, and the resulting aluminum layer 22 represents the information contained on the disc.

A molded CD has a thickness of 1.2 mm, and a DVD is to have the same thickness. But the molded DVD substrate has a thickness of only 0.6 mm. For this reason, the substrate structure is coated with a polymer resin 24, and a blank 0.6-mm thick disc 26 is bonded to it. In the last step, a roller 28 or some other mechanism prints the DVD label on the disc 26.

It is important to appreciate that while the element 14 is called a "stamper," it is used in an injection molding process. Injection molding is at the heart of disc manufacture, and injection molding involves use of a closed cavity into which liquid plastic is injected, the cavity imparting its form to the plastic after it cools and hardens.

Figure 2:
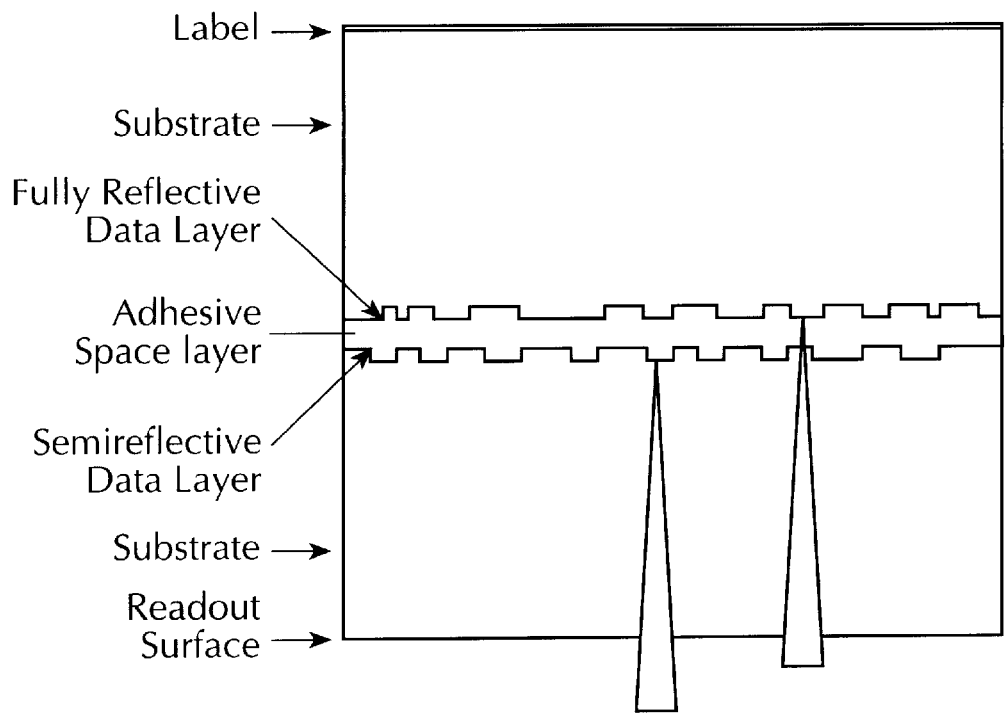
FIG. 2 depicts a prior art Dual-Layer, Single-Side DVD-9 disc which is basically two 0.6-mm discs bonded together, each made in accordance with the steps depicted in FIG. 1.

The DVD of FIG. 2 is referred to as a Dual Layer, Single Side disc because it has two information layers that can be read from one side (the side at the bottom with the stylized triangular-shaped laser beam). Every DVD is composed of two bonded plastic substrates. Each substrate with data can contain one or two layers of data. The first layer, called layer 0, is closest to the side of the disc from which the data is read. The second layer, called layer 1, is farthest from the readout surface. A disc is read from the bottom, so layer 0 is below layer 1. The layers are spaced very close together—the distance between layers is less than one-tenth of the thickness of the substrate (less than one-twentieth of the thickness of the overall DVD).

In the case of a single layer, the information surface is covered with a thin reflective layer of aluminum by a sputtering process. This creates a metallic coating between 35 and 55 nanometers thick. For two layers, the laser must be able to reflect from the first layer when reading it, but also focus through it when reading the second layer. Therefore, the first layer is only semireflective, while the second layer is fully reflective (a relative term since even the fully reflective layer is only about 70% reflective).

The various layers of the disc of FIG. 2 are self-explanatory, but there are two points that should be understood. The first is that while the capacity of the single layer disc of FIG. 1 is 4.7 gigabytes, the capacity of the disc of FIG. 2, even though it has two information layers, is only 8.5 gigabytes, less than twice the capacity of the single-layer disc. The reason for this is that the readout beam must pass through the outer layer to get to the inner layer, a distance of about 20 to 70 microns, and this gives rise to inter-layer crosstalk. To reduce the crosstalk, the minimum pit length of both layers is increased from 0.4 um to 0.44 um and there are slightly fewer tracks per inch, thus reducing the overall capacity somewhat.

The second point is that the prior art DVD of FIG. 2 has each of its information layers in a different 0.6-mm thick disc. Each "half DVD" is molded in the same kind of injection molding machine that has been used for many years in making CDs. Two discs are made in a conventional manner, with the major difference from the CD production process simply being that one of the reflective coatings has less metal (typically, gold) sputtered onto it so that it is only semireflective. The final DVD is produced simply by gluing what are basically two thin (higher capacity) CDs to each other. (The adhesive space layer serves to bond the two discs to each other, and also to provide a 55-micron separation that should be present for proper focusing.)

The Dual layer, Single Side DVD-9 disc of FIG. 2, with one layer in each of the two substrates, is based on the design of Matsushita. But there is another way to make a DVD-9 disc, using the 2P process proposed by 3M. Instead of forming one layer in each substrate, the 2P process gives rise to a single 0.6-mm substrate structure with two internal information layers; in this case, the second substrate, necessary to give rise to a 1.2-mm thick finished product, is a total blank. The 2P process requires a stamping operation that can not take place in an enclosed mold, in addition to an injection molding operation, as will be described in detail below. Because CD manufacturing companies, the "natural" manufacturers for DVDs, have not used the required stamping equipment for making CDs, there is no known way to migrate easily to the making of dual-layer DVD discs without a major capital investment in equipment.

It should be appreciated that the real problem is not in making DVD-9 discs. The 3M-type 2P process that requires a stamping operation in "open" space is not necessary for making DVD-9 discs since conventional injection molding equipment by itself, using the Matsushita process, is sufficient for making DVD-9 discs (see FIG. 2). The real problem is in making 1.2 mm thick DVD-14 and DVD-18 discs. A prior art DVD-14 disc has two substrates, one a single layer and the other a dual layer. Because the single-layer substrate has a reflective layer that is read from its own side of the overall disc, the two information layers for the dual-layer disc that are read from the other side must both be in the same substrate. This means that a process similar to the 2P process must be used because the second layer for the DVD-9 side of the overall disc can no longer come from the other substrate—the second layer must be internal to the dual-layer substrate structure. Similarly, a DVD-18 disc (Dual Layer, Dual Side) requires two layers in each substrate, for a total of four. Thus, there is no known way to avoid using some form of stamping process, along the lines of those proposed by 3M, for high capacity DVDs.

To understand how the 3M process for making a dual-layer disc requires an open-space stamping operation, reference may be made to FIG. 3 which depicts the steps in making a simple Dual Layer, Single Side DVD-9 disc. The basic idea is to form one layer on a substrate, and to then add a second layer to the same substrate using a photopolymer (2P) material that is stamped.

In the first step, a substrate 40 with an information layer is injection molded in the usual way. Then gold is sputtered onto the information layer, as shown by the numeral 42, to form a semireflective layer 42a. This layer is covered with viscous, transparent, UV-resin material 44, and stamping equipment 46 (whose undersurface 46a in FIG. 3 has the pit-and-land pattern required of the second information layer) forms the inner-layer pattern in the surface 44a of the viscous material. While the stamper is in place, ultra-violet light is directed from the underside of the substrate, up through the semireflective layer 42a, to the resin in order to harden it. This stamping operation can not take place in an enclosed mold for the obvious reason that the mold itself would block the UV light from entering, and the resin would not harden in a reasonable time, if at all. (Also, injection molding equipment is operated at very high temperatures, and the 2P process must take place at room temperature.)

After the inner information layer has hardened, a conventional sputtering step, shown by the numeral 50, is employed to provide a fully reflective layer. Finally, a layer of glue 52 is placed on the fully reflective layer, and a blank 0.6-mm substrate 54 is glued on to form the second half of the finished disc. (Although reference is made herein to using "glue" to bond the two substrates to each other, in actual practice the two standard gluing techniques involve use of a hot melt or a UV resin. Also, after the bonding, a label can be printed in known manner.) The finished disc is "Single Side" because it is read from only one side, as shown by the diagrammatic laser beams 56a and 56b. It is "Dual Layer" because there are two information layers that are read from the single reading side.

Figure 4:
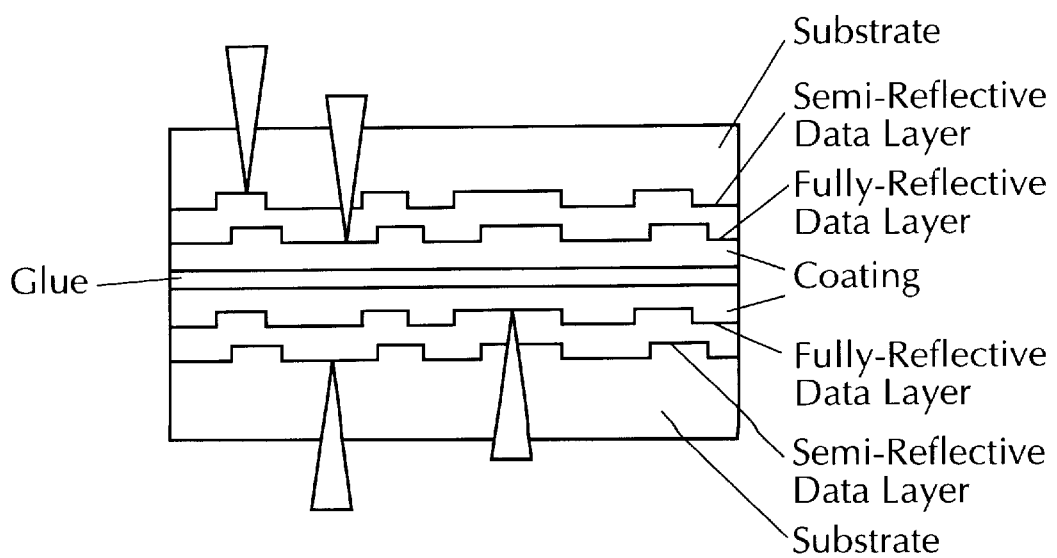
FIG. 4 depicts a prior art Dual-Layer, Dual-Side DVD-18 disc made by bonding together two Dual-Layer, Single-Side 0.6-mm discs.

A DVD-14 disc has two substrates, one a single layer (FIG. 1) and one a dual layer. As described above, the dual layer half is made today by the 2P process because the alternative dual-layer technique of FIG. 2 requires one layer in each of the two substrates, and were the second layer placed in the other substrate, then this substrate would have two layers and would have to be made using the 2P process. (A DVD-14 disc has a total of three information layers, so one of the two substrates must have two layers.) FIG. 4 shows a DVD-18 disc, where each substrate has two layers. It is apparent that each substrate must be made using the 2P or a comparable process that requires a stamping operation.

DETAILED DESCRIPTION OF THE PREFERRED EMBODIMENT

Figure 5:
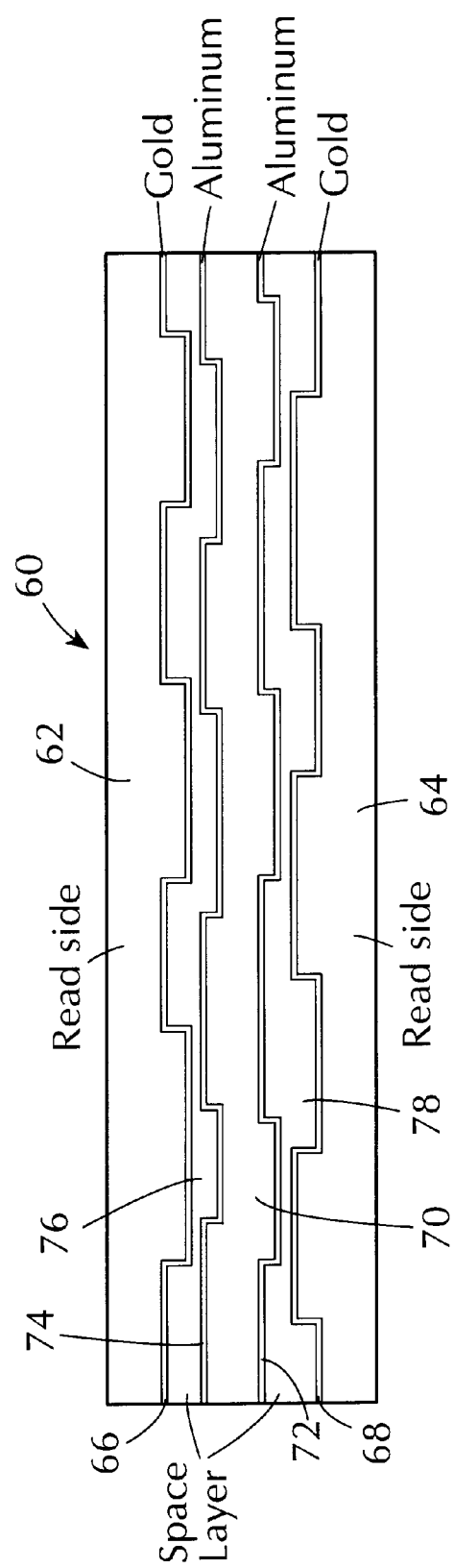
FIG. 5 depicts a Dual-Side DVD-18 disc of my invention.

The method of my invention, for making a 3-layer or 4-layer two-sided disc (DVD-14 or DVD-18) using injection molding equipment without requiring additional stamping equipment, is easily understood by considering the finished disc 60 itself, shown in FIG. 5. The basic idea is to make two outer substrates 62, 64, each with a semireflective (preferably, gold) metallic pit-and-land information layer 66, 68 in the usual way—with injection molding and sputtering equipment. (See FIG. 1.) The middle substrate 70 is similarly made in injection molding equipment with pit-and-land information layers on both surfaces, and fully reflective (preferably, aluminum) metallic layers 72, 74 are sputtered on the two surfaces. Conventional injection molding equipment can be used. All that is required is that the molds of the molding machine accommodate two stampers, one for each of the two information layers. One stamper is placed on the stationary side of the mold, and the other is placed on the movable side. The three substrates are then bonded together as a sandwich with space layers 76, 78 separating them. The same space-layer "glue" used in the prior art for bonding two discs can be used for bonding the three of my invention.

Each outer surface of the finished DVD-18 disc (DVD-14 if one of the information layers has no information) is a "read side", as indicated in FIG. 5, because two layers can be read by light passing through it, in the same way shown in FIG. 4. The substrates 62, 64 are made of the usual material, polycarbonate, because these substrates have to pass light and have the expected properties of a DVD disc. The middle, dual-information substrate, however, does not pass light since both of its outer surfaces fully reflect light. Therefore, the material of which the middle substrate 70 is made need not have any special optical properties.

Although not shown in the drawing, the usual protective coatings may be applied as the last step in the making the disc.

The outer substrates cannot be arbitrarily thin because they serve to focus impinging light onto the information layers and they therefore must satisfy the DVD specifications. They therefore should have a thickness of approximately 0.550 mm each. The thickness of the middle substrate is determined by the minimum thickness that provides structural integrity, approximately 0.300 mm in the illustrative embodiment of the invention. (Such a thin substrate exhibits birefringence, but it is of no moment since light never passes through the middle substrate.) The reflective layers have negligible thickness as in the prior art, and each space layer has a thickness of 0.050 mm. The total thickness of the finished disc is thus 1.5 mm, the upper limit for thickness of a DVD disc.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A DVD disc sandwich structure having four information layers comprising of first outer molded polycarbonate substrate of a thickness approximately 0.550 mm having an inwardly facing first data layer with a first semi-reflective coating, a second outer molded polycarbonate substrate of a thickness of approximately 0.0550 mm having an inwardly facing second data layer with a second semi-reflective coating, and a third middle molded substrate bonded to the first and second outer molded substrates and having a pair of opposed data layers with fully reflective coatings.

2. A DVD disc sandwich structure in accordance with claim 1 wherein said third middle molded substrate has a thickness of approximately 0.300 mm.

3. A DVD disc sandwich structure in accordance with claim 1 wherein said semireflective coatings are sputtered gold and said fully reflective coatings are sputtered aluminum.

4. A DVD disc sandwich structure in accordance with claim 1 wherein each of said first and second outer molded substrates has optical properties that satisfy DVD specifications.

5. A DVD disc sandwich structure in accordance with claim 4 wherein said third middle molded substrate is sufficiently thin that the sandwich is no thicker than 1.5 mm.

6. A disc sandwich structure having at least three information layers comprising first and second outer molded polycarbonate substrates each having a thickness of approximately 0.550 mm, at least one of which has an inwardly facing data layer with a semi-reflective coating, and a third middle molded substrate bonded to the first and second outer molded substrates and having a pair of opposed data layers with fully reflective coatings.

7. A disc sandwich structure in accordance with claim 1 wherein said third middle molded substrate has a thickness of approximately 0.300 mm.

8. A disc sandwich structure in accordance with claim 6 wherein said at least one semireflective coating is sputtered gold and said fully reflective coatings are sputtered aluminum.

9. A disc sandwich structure in accordance with claim 6 wherein each of said first and second outer molded substrates has optical properties that satisfy DVD specifications.

10. A disc sandwich structure in accordance with claim 9 wherein said third middle molded substrate is sufficiently thin that the sandwich is no thicker than 1.5 mm.

11. A DVD disc sandwich structure having four information layers comprising a first outer molded substrate having optical properties that satisfy DVD specifications and an inwardly facing first data layer with a first semi-reflective coating, a second outer molded substrate having optical properties that satisfy DVD specifications and an inwardly facing second data layer with a second semi-reflective coating, and a third middle molded substrate bonded to said to the first and second outer molded substrates having a pair of opposed date layers with fully reflective coatings such that said sandwich is no thicker than 1.5 mm due to the third middle molded substrate being sufficiently thin.

12. A DVD disc sandwich structure in accordance with claim 11 wherein said first and second outer molded substrates are made of polycarbonate and each has a thickness of approximately 0.550 mm.

13. A DVD disc sandwich structure in accordance with claim 12 wherein said third middle molded substrate has a thickness of approximately 0.300 mm.

14. A DVD disc sandwich structure in accordance with claim 11 wherein said semi-reflective coatings are sputtered gold and said fully reflective coatings are sputtered aluminum.

15. A disc sandwich structure having at least three information layers comprising first and second outer molded substrates having optical properties that satisfy DVD specifications with at least one having an inwardly facing data layer with a semireflective coating, and a third middle molded substrate bonded to the first and second outer molded substrate and having a pair of opposed data layers with fully reflective coatings such that said sandwich is no thicker than 1.5 mm due to the middle molded substrate being sufficiently thin.

16. A disc sandwich structure in accordance with claim 15 wherein said first and second outer molded substrates are made of polycarbonate and each has a thickness of approximately 0.550 mm.

17. A disc sandwich structure in accordance with claim 16 wherein said third middle molded substrate has a thickness of approximately 0.300 mm.

18. A disc sandwich structure in accordance with claim 17 wherein said at least one semi-reflective coating is sputtered gold and said fully reflective coatings are sputtered aluminum.

19. A method of making a four-layer DVD-14 or DVD-18 disc comprising the steps of:
   (a) molding a first polycarbonate substrate having a thickness of approximately 0.550 mm to have a first data layer and coating said first data layer with a first semi-reflective coating to form a first substrate structure,
   (b) molding a second polycarbonate substrate having a thickness of approximately 0.550 mm to have a second data layer and coating said second data layer with a second semi-reflective coating to form a second substrate structure,
   (c) molding a third substrate to have third and fourth opposed data layers, and coating said third and fourth data layers with third and fourth fully reflective coatings to form a third substrate structure, and
   (d) forming a sandwich of said first, second and third substrate structures by bonding said first semi-reflective coating to said third fully reflective coating, and bonding said second semi-reflective coating to said fourth fully reflective coating.

20. A method of making a four-layer disc in accordance with claim 19 wherein said third substrate has a thickness of approximately 0.300 mm.

21. A method of making a four-layer disc in accordance with claim 19 wherein said semireflective coatings are sputtered gold and said fully reflective coatings are sputtered aluminum.

22. A method of making a four-layer disc in accordance with claim 19 wherein each of said first and second substrates has optical properties that satisfy DVD specifications.

23. A method of making a four-layer disc in accordance with claim 22 wherein said third substrate is sufficiently thin that the sandwich is no thicker than 1.5 mm.

24. A method of making a four-layer optical disc comprising the steps of:

(a) molding two polycarbonate substrates each with a thickness of approximately 0.550 mm, at least one of which has a data layer which is given a semi-reflective coating, to form two substrate strictures, (b) molding a third substrate to have two data layers on opposite faces thereof both of which are given fully reflective coatings to form a third substrate structure, and (c) forming a sandwich of said substrate structures by bonding said third substrate structure between the other two.

25. A method of making a four-layer disc in accordance with claim 24 wherein said third substrate has a thickness of approximately 0.300 mm.

26. A method of making a four-layer disc in accordance with claim 24 wherein the semireflective coating on said at least one substrate is sputtered gold and the fully reflective coatings on said third substrate are sputtered aluminum.

27. A method of making a four-layer disc in accordance with claim 24 wherein each of said two substrates has optical properties that satisfy DVD specifications.

28. A method of making a four-layer disc in accordance with claim 27 wherein said third substrate is sufficiently thin that the sandwich is no thicker than 1.5 mm.

29. A method of making a four-layer DVD-14 or DVD-18 disc comprising of the steps of:

(a) molding a first substrate having optical properties that satisfy DVD specifications in order to have a first data layer and coating said first data layer with a first semi-reflective coating to form a first substrate structure, (b) molding a second substrate having optical properties that satisfy DVD specifications in order to have a second data layer and coating said second data layer with a second semi-reflective coating to form a second substrate structure, (c) molding a third substrate to have third and forth opposed data layers, and coating said third and fourth data layers with third and fourth fully reflective coatings to form a third substrate structure, and (d) forming a sandwich of said first, second and third substrate structures that is no thicker than 1.5 mm due to said third substrate being sufficiently thin by bonding said first semi-reflective coating to said third fully reflective coating, and bonding said second semi-reflective coating to said fourth fully reflective coating.

30. A method of making a four-layer disc in accordance with claim 29 wherein said first and second substrates are molded of polycarbonate and each has a thickness of approximately 0.550 mm.

31. A method of making a four-layer disc in accordance with claim 30 wherein said third substrate has a thickness of approximately 0.300 mm.

32. A method of making a four-layer disc in accordance with claim 29 wherein said semi-reflective coatings are sputtered gold and said fully reflective coatings are sputtered aluminum.

33. A method of making a four-layer optical disc comprising the steps of:

(a) molding two substrates having optical properties that satisfy DVD specifications, at least one of which has a data layer which is given a semi-reflective coating, to form two substrate structures, (b) molding a third substrate to have two data layers on opposed faces thereof both of which are given fully reflective coatings to form a third substrate structure, and (c) forming a sandwich of said substrate structures that is no thicker than 1.5 mm due to set third substrate being sufficiently thin by bonding said third substrate structure between the other two.

34. A method of making a four-layer disc in accordance with claim 33 wherein said first and second substrates are molded of polycarbonate and each has a thickness of approximately 0.550 mm.

35. A method of making a four-layer disc in accordance with claim 34 wherein said third substrate has a thickness of approximately 0.300 mm.

36. A method of making a four-layer disc in accordance with claim 33 wherein the semi-reflective coating on said at least one substrate is sputtered gold and the fully reflective coatings on said third substrate are sputtered aluminum.

* * * * *